Aug. 5, 1924.

W. W. MacDONALD

TRACTOR

Filed June 23, 1920

Inventor
William W. MacDonald,
By Chas E. Townsend
His Atty.

Aug. 5, 1924.

W. W. MacDONALD

TRACTOR

Filed June 23, 1920

Inventor
William W. MacDonald.

By Chas. E. Townsend
His Atty.

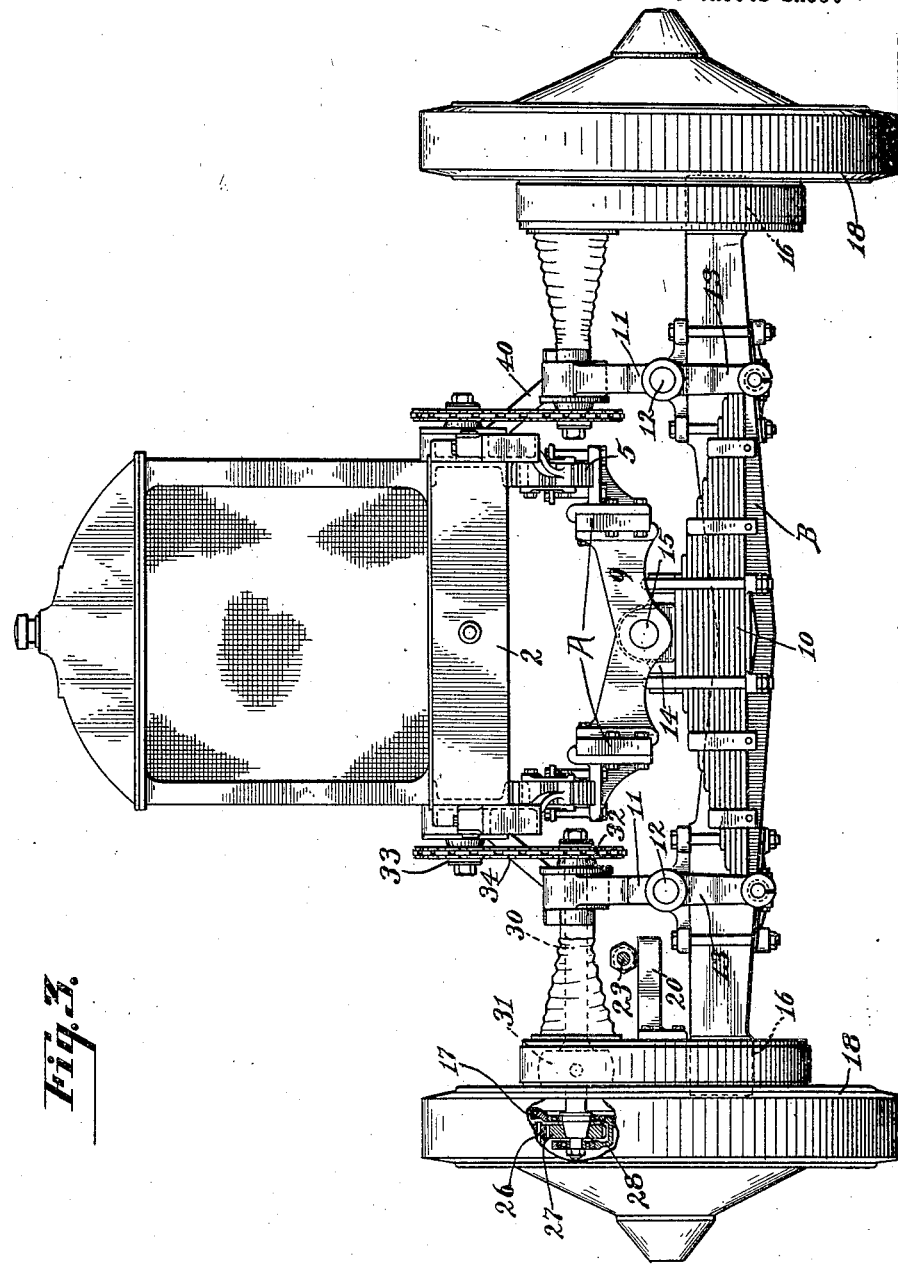

Patented Aug. 5, 1924.

1,503,658

UNITED STATES PATENT OFFICE.

WILLIAM W. MacDONALD, OF SAN FRANCISCO, CALIFORNIA.

TRACTOR.

Application filed June 23, 1920. Serial No. 391,096.

*To all whom it may concern:*

Be it known that I, WILLIAM W. MACDONALD, a citizen of the United States, residing at the city and county of San Francisco and State of California, have invented a new and useful Improvement in Tractors, of which the following is a specification.

This invention relates to a tractor and especially to that type of tractor in which the front wheels are employed both for driving and steering purposes.

One of the objects of the present invention is to provide a tractor of the character described in which the engine, transmission, and other parts of the driving mechanism may be compactly arranged in a closely assembled unit, and so supported with relation to the driving wheels that road shocks and engine torque may be readily absorbed by interposed resilient supporting members as will hereinafter be described.

Another object of the invention is to provide a main frame, an axle for the support thereof, a rocker bearing for the axle, springs between the axle and the rocker bearing to permit lateral movement of the axle with relation to the frame, and further to provide an engine frame and a resilient support between said frame and the main frame.

Another object of the invention is to arrange the driving mechanism in such a manner that the engine, transmission and the jack shaft will be supported by the engine frame; further to provide a pair of driving shafts through which power is transmitted to the driving wheels, and to so mount said shafts that they will be supported by the main axle and at a point considerably above the same.

Another object of the invention is to provide a chain drive connection between the jack shaft and the respective driving shafts, and to mount a universal joint on each driving shaft to permit the front wheels to serve both for steering and driving purposes.

Other objects will hereinafter appear.

The invention consists of the parts and the construction, combination and arrangement of parts as hereinafter more fully described and claimed, having reference to the accompanying drawings, in which—

Fig. 3 is a front view.

Figure 1:
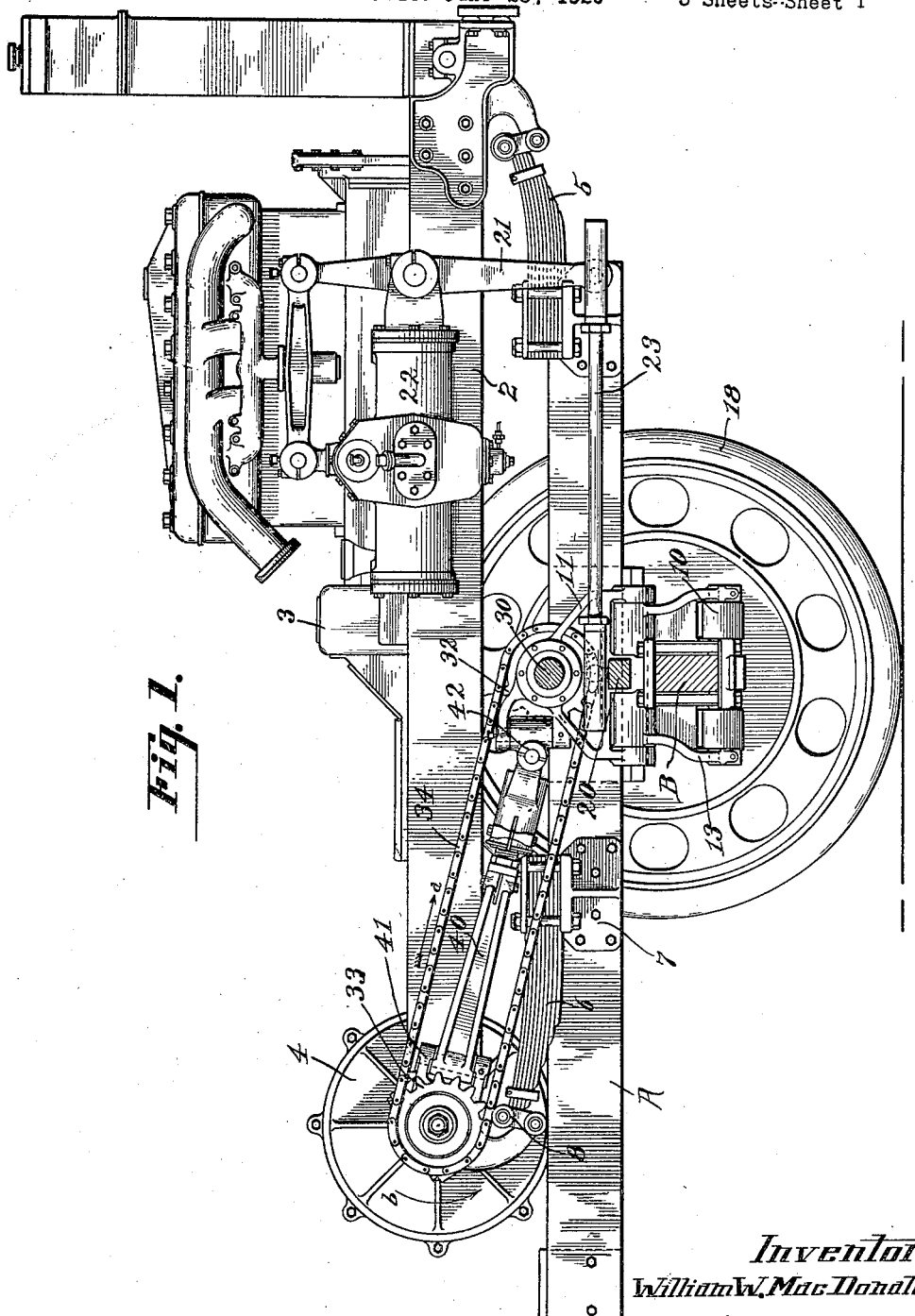
Fig. 1 is a side elevation of the tractor partly in section.
Figure 2:
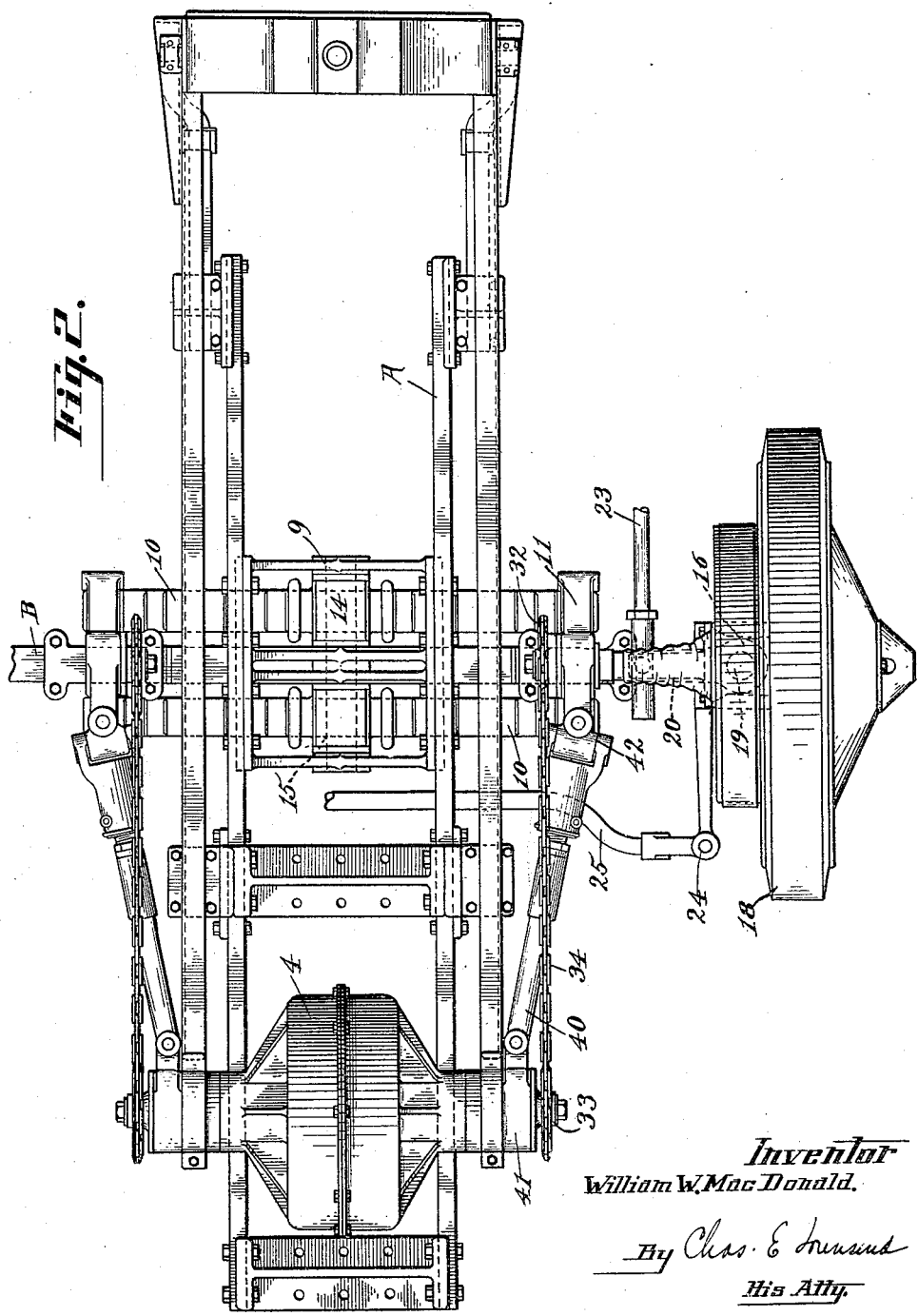
Fig. 2 is a partial plan view of the same.

Referring to the drawings in detail, A indicates a main frame and 2 a sub-frame. This frame will hereinafter be termed the engine frame as it supports the engine, the transmission 3 and the jack shaft 4. The engine frame is resiliently mounted with relation to the main frame as cantilever springs 5 and 6 are interposed between each end of the engine frame and the main frame. The cantilever springs are secured in the usual manner inasmuch as they are rigidly fastened at their inner ends by spring clamp brackets 7 and connected by means of shackles 8 to the engine frame. The resilient mounting is one of the important features of the present invention and will later be described.

Extending crosswise of the main frame and positioned below the same is a rigid axle B. Secured to the main frame and centrally positioned with relation thereto is a rocker bearing 9 and interposed between the rocker bearing and the axle B is a pair of semi-elliptical springs 10 which serve as a resilient support for the main frame with relation to the axle and also permits a vertical lateral rocking movement of the axle and a limited turning movement. Secured adjacent each end of the axle is a bearing member 11 and extending through each bearing member in parallelism with the main frame is a pin 12. These pins serve as pivotal supports for shackle links 13, and the free ends of the semi-elliptical springs 10 are attached thereto. There are a pair of springs, one disposed on each side of the axle and positioned parallel therewith. The center portion of each spring is secured to a spring clamp 14 and a pin 15 extends through said spring clamps and the rocker bearing 9. This pin permits lateral rocking movement of the axle as it is disposed at right angles thereto. Pivotally mounted on each end of the main axle is a steering knuckle 16, and supported thereby is a bearing plate 17 which also serves as a dust guard for each driving wheel indicated at 18. The wheels are each journalled on a spindle 19 carried by the respective knuckles and they may therefore serve the function of steering wheels. One of the knuckles is provided with a steering arm 20, which is connected with an operating lever 21 of a hydraulic steering mechanism, generally indicated at 22, the lever 21 being connected with the steering arm 20 by a link 23. The steering knuckles are otherwise provided with arms 24 and a tie rod 25 as in usual practice. The wheels 18 are not only employed for the purpose of steering the tractor but they are also used as driving members. Each wheel is therefore provided with an internal gear 26, to which power is transmitted by means of pinions 27, these pinions being supported in bearing members 28 secured to the dust guards 19.

Journalled in each bearing member 11 is a driving shaft 30, and forming a connection between said shafts and the respective driving pinions 27 are universal joints 31. Secured on the inner end of each driving shaft is a sprocket gear 32, and secured on each end of the jack shaft 4 is a similar sprocket gear 33, and connecting the respective sprocket gears 32 and 33 are chains 34, by which power is transmitted to the driving shafts 30.

One of the important features of the present invention is the provision of means for absorbing all engine torque and road shocks. This is accomplished first by interposing cantilever springs between the engine frame and the main frame, and secondly by interposing the semi-elliptical springs between the main frame and the axle. Two separate resilient supports are in this manner interposed between the driving wheels and the driving mechanism, and practically all road shocks and engine torque are absorbed by the same, thus relieving the driving mechanism of excess strains and shocks when in operation and consequently prolonging the life and wearing qualities of the tractor as a whole.

To clearly explain the manner in which the engine torque and road shocks are absorbed, we will suppose that one or both of the driving wheels enter a chuck hole or encounter some obstruction which tends to resist rotary movement thereof. Such resistance against rotation would of course be imposed upon the sprocket chains 34 and as these travel in the direction indicated by arrow *a* (see Fig. 1), it is obvious that a heavy pull will be exerted upon the jack shaft and this in a downward direction as indicated by arrow *b*. Such downward pull will of course be absorbed by the rear cantilever springs interposed between the main frame and the engine frame, and the shock or resistance through the driving mechanism will to that extent be absorbed or at least considerably cushioned; slacking of the chains during such movement being prevented by the interposition of radius rods as indicated at 40. These rods are pivotally attached to the jack shaft as indicated at 41, and at their opposite ends they are also pivotally attached to the bearing members 11 as indicated at 42, a universal connection being here formed to permit lateral rocking movement of the main axle when the tractor is in operation. Engine torque, road shocks, or resistance to which the driving mechanism may be subjected is also partly absorbed by the main supporting springs 10 interposed between the main frame and the axle. This takes place due to the fact that the springs are arranged in parallelism with the axle and may therefore be subjected to compression or extension independent of each other. Such movement permits a slight turning movement of the axle about its longitudinal axis and to this extent will assist in absorbing excess shocks and strains such as heretofore mentioned. Engine wear and tear should therefore be reduced to a minimum, due to the cushioning or shock absorbing means provided, to-wit, first, the main supporting springs, and secondly the cantilever springs interposed between the main frame and the engine frame. Wear in the transmission and the remainder of the driving mechanism will of course be similarly lessened.

The present tractor is equipped with the hydraulic steering mechanism as heretofore stated, which will form the subject of a separate application. This steering mechanism is generally indicated at 22. It actuates an operating lever 21 and movement is transmitted from this lever through a link 23 to one of the steering knuckles, movement being in turn transmitted from said steering knuckle to the opposite steering knuckle by means of the tie rod 25. It is therefore possible to drive and steer by means of the front wheels as universal joints 31 are interposed between the driving shafts 30 and the driving pinions 27. These knuckles only swing on a horizontal plane when the wheels are turned and are not subject to any other movement as lateral rocking movement of the axle will also cause lateral rocking movement of the driving shafts 30, due to the fact that they are supported by the axle through the medium of the bearing members 11, the wheels 18 and the bearing members 28. Resistance when steering is therefore lowered to a minimum and general efficiency is obtained when all-around service is considered, due to the fact that the entire unit is compactly arranged and closely assembled, this feature being of further importance as it permits close assembling of bearing shafts, etc., and to this extent eliminates unnecessary friction, due to twisting of the frames, disalignment of shafts, etc.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. In a tractor of the character described a main frame, an axle supporting the same, a steering knuckle on each end of the axle, a traction wheel on each knuckle, springs parallel with the axle and supporting the frame with relation to the axle, said springs permitting lateral rocking movement of the axle with relation to the main frame, and also permitting a slight turning movement of the axle with relation to the main frame, an internal gear on each wheel, a horizontal bearing on each knuckle, a shaft in each bearing, a pinion on each shaft and intermeshing with the adjacent internal gear, a horizontal bearing adjacent each end of the axle and positioned above the same, a shaft journalled in each of said bearings, means for driving each of said shafts, and a universal driving connection between each of said shafts and the shaft carried by the knuckles.

2. In a tractor of the character described a main frame, an axle supporting the same, driving wheels on the axle, springs parallel with the axle and supporting the frame with relation to the axle, said springs permitting lateral rocking movement of the axle with relation to the frame and also permitting a slight turning movement of the axle with relation to the frame, and a driving connection for each wheel, said driving connection comprising a pair of bearings elevated with relation to the axle and secured thereto, a driving shaft journaled in each bearing, said driving shafts adapted to transmit a slight turning movement to the axle, which turning movement is resisted and cushioned by the springs, and a driving connection between each shaft and wheel.

3. In a tractor of the character described a main frame, an axle supporting the same, driving wheels on the axle, springs parallel with the axle and supporting the frame with relation to the axle, said springs permitting lateral rocking movement of the axle with relation to the main frame and also permitting a slight turning movement of the axle with relation to the main frame, a jack shaft, a resilient support permitting radial movement of the jack shaft at right angles to its longitudinal axis, a driving shaft journalled on each end of the axle, and mounted above the same, a driving connection between each of said shafts and the jack shaft, a pair of radius rods interposed between said shafts and the jack shaft, said rods being universally connected at their respective ends, and a universal driving connection between each driving shaft carried by the axle and the driving wheels.

4. In a tractor of the character described a main frame, a super-frame above the same, springs interposed between each end of the super-frame and the main frame, means connecting the super-frame and the springs to permit vertical movement and a limited fore and aft movement of the super-frame with relation to the main frame, an axle, a pair of springs interposed between the axle and the main frame, said springs permitting fore and aft tilting movement and lateral movement of the main frame with relation to the axle, traction wheels, one on each end of the axle, a power plant and transmission mechanism carried by the super-frame, a driving connection between the transmission mechanism and each traction wheel, and a pair of radius rods interposed between the transmission mechanism and the axle, said radius rods being universally connected at their lower ends with the axle and universally connected at their upper ends with relation to the transmission mechanism, and said radius rods maintaining a fixed relation between the transmission mechanism and the axle.

5. A tractor of the character described comprising a main frame, an axle supporting said main frame, a pair of springs interposed between the main frame and the axle and disposed in parallelism with the axle, one on each side thereof, said springs permitting lateral movement of the axle with relation to the main frame and a slight turning movement of the axle with relation to the main frame, a steering knuckle on each end of the axle, a traction wheel on each knuckle, a super-frame disposed above the main frame, springs interposed between each end of the super-frame and the main frame, and permitting vertical and longitudinal movement of the super-frame with relation to the main frame, a power plant carried by the super-frame, a jack shaft carried by the super-frame and driven by the power plant, a driving shaft journalled on each end of the axle, a driving connection between each driving shaft and the jack shaft, a radius rod of fixed length interposed between each driving shaft and the jack shaft, each radius rod being universally connected at each end to the respective shafts and maintaining a fixed relation between the driving shafts and the jack shaft, and a universal driving connection between each driving shaft and each adjacent traction wheel.

6. In a tractor of the character described a main frame, an axle supporting the same, springs interposed between the axle and the main frame permitting lateral movement and turning movement of the axle with relation to the main frame, a traction wheel journalled on each end of the axle, a driving member journalled on each end of the axle and above the same, a universal connection between each driving member and traction wheel to transmit power to each traction wheel, a super-frame above the main frame, springs supporting said super-frame and permitting vertical and longitudinal movement of the super-frame with relation to the main frame, a jack shaft supported by the super-frame, a motor and transmission on the super-frame connected therewith, radius rods connecting the driving members carried by the axle and the jack shaft and maintaining a fixed relation between the same, and means for transmitting power from the jack shaft to said driving members.

7. In a tractor of the character described, a main frame, an axle supporting the same, said axle being resiliently connected to the main frame so that a lateral rocking movement is permitted and similarly a slight turning movement about its longitudinal axis, a super-frame carried by the main frame and resiliently supported thereby, said super-frame permitting a limited up and down movement and a limited endwise movement with relation to the main frame, a jack shaft journaled in the super-frame, a pair of driving shafts journaled on the main axle and above the same, a driving connection between each of said shafts and the jack shaft, and a pair of radius rods interposed between the jack shaft and the driving shafts.

8. In a tractor of the character described, an axle, a main frame, resilient means interposed between the axle and the main frame permitting lateral and turning movement of the axle with relation to the main frame, a super-frame, resilient means interposed between the super-frame and the main frame, said resilient means permitting a limited vertical and endwise movement of the super-frame with relation to the main frame, and radius rods interposed between the axle and the super-frame.

9. In a tractor of the character described, a main frame, a super-frame, resilient means interposed between the super-frame and the main frame permitting a limited vertical and endwise movement of one end of the super-frame with relation to the main frame, a jack shaft journaled on this end of the super-frame, a drive shaft supported by the axle, means for transmitting power from the jack shaft to the drive shaft, and a radius rod interposed between the jack shaft and the drive shaft.

10. In a tractor of the character described, a main frame, an axle, means interposed between the axle and the main frame permitting a limited lateral movement, and also a limited turning movement of the axle with relation to the main frame, a super-frame, resilient means interposed between the super-frame and the main axle, and a connection between the axle and the super-frame whereby movement of the axle is transmitted to the super-frame.

In testimony whereof I have hereunto set my hand in the presence of two subscribing witnesses.

WILLIAM W. MacDONALD.

Witnesses:
W. W. HEALLY,
M. E. EWING.